United States Patent [19]
Pavlicevic et al.

[11] Patent Number: 6,026,113
[45] Date of Patent: Feb. 15, 2000

[54] METHOD FOR THE ELECTROMAGNETIC STIRRING OF THE LIQUID METAL IN ELECTRIC ARC FURNACES AND RELATIVE DEVICE

[75] Inventors: Milorad Pavlicevic, Udine, Italy;
Anatoly Kolesnichenko, Kiev, Ukraine;
Alfredo Poloni, Fogliano di Redipulia;
Cristina Bassi, Udine, both of Italy

[73] Assignee: Danieli & C. Officine Meccaniche SpA, Buttrio, Italy

[21] Appl. No.: 08/949,763

[22] Filed: Oct. 14, 1997

[30] Foreign Application Priority Data

Oct. 14, 1996 [IT] Italy ................... UD96A0194

[51] Int. Cl.$^7$ ............................................ F27D 23/04
[52] U.S. Cl. ................................... 373/85; 373/108
[58] Field of Search .......................... 373/107, 108, 373/102, 146, 154, 4, 85, 71; 314/344

[56] References Cited

U.S. PATENT DOCUMENTS

| | | | |
|---|---|---|---|
| 1,562,825 | 11/1925 | Evreynoff ........................... | 373/107 |
| 1,683,986 | 9/1928 | Northrup ........................... | 373/154 |
| 1,943,802 | 1/1934 | Northrup ........................... | 373/146 |
| 2,322,618 | 6/1943 | De Mare ........................... | 373/146 |
| 3,683,094 | 8/1972 | Schlienger ........................ | 373/107 |
| 4,149,024 | 4/1979 | Stenkvist et al. . | |
| 4,495,625 | 1/1985 | Heberlein et al. ............... | 373/107 |
| 4,528,673 | 7/1985 | Stenkvist .......................... | 373/108 |
| 4,821,284 | 4/1989 | Janiak et al. .................... | 373/107 |
| 4,931,702 | 6/1990 | Voronin et al. .................. | 315/344 |
| 5,134,628 | 7/1992 | Stenkvist .......................... | 373/107 |
| 5,142,650 | 8/1992 | Kida et al. ....................... | 373/88 |
| 5,317,591 | 5/1994 | Stenkvist .......................... | 373/107 |
| 5,383,218 | 1/1995 | Bergman et al. ................ | 373/107 |
| 5,410,564 | 4/1995 | Takashiba et al. ............... | 373/102 |
| 5,563,904 | 10/1996 | Colpo et al. ..................... | 373/146 |

FOREIGN PATENT DOCUMENTS

| | | |
|---|---|---|
| 2331233 | 6/1977 | France . |
| 3232551 | 6/1983 | Germany . |
| 1067386 | 5/1967 | United Kingdom . |

OTHER PUBLICATIONS

Stahl Und Eisen, vol. 114 No. 8 Aug. 15, 1994 pp 75–77 Stenkvist S et al; Neue Entwicklung Fuer Drehstrom.

*Primary Examiner*—John A. Jeffery
*Assistant Examiner*—Quang Van
*Attorney, Agent, or Firm*—Antonelli, Terry, Stout & Kraus, LLP

[57] ABSTRACT

Method for the electromagnetic stirring of the liquid metal (14) in direct current electric arc furnaces which include a hearth (35) defined by a floor (13) and by side walls (15), a central cathode (11) cooperating with anodes (12) arranged on the floor (13) of the furnace and fed by a main current ($I_0$), wherein there is an electromagnetic system generating a magnetic field inside the liquid metal (14) whose vertical ($B_z$) and radial ($B_r$) components interact respectively with the radial ($J_r$) and vertical ($J_z$) components of the overall current present in the liquid metal (14). The method and device use a first electromagnetic system including at least a first winding (19) through which a current ($I_1$) flows and operating from inside the floor (13) and the walls (15) of the hearth (35), and a second electromagnetic system generating a secondary induced current ($I_3$), between adjacent anodes (12), which circulates through the liquid metal (14). The first winding includes a plurality of spirals (20), at least some of the spirals (20) being arranged inside the refractory of the hearth (35) in cooperation with the floor (13) and with at least a vertical segment of the side walls (15).

30 Claims, 4 Drawing Sheets fig.1 fig.2 fig.5 fig.6 fig.7a fig.7b fig.8 fig.9 fig.11 fig.10 fig.12 fig.13

METHOD FOR THE ELECTROMAGNETIC STIRRING OF THE LIQUID METAL IN ELECTRIC ARC FURNACES AND RELATIVE DEVICE

BACKGROUND OF THE INVENTION

This invention concerns a method for the electromagnetic stirring of the liquid metal in electric arc furnaces and the relative stirring device.

The invention is applied in the siderurgical field and in particular in direct current electric arc furnaces, in order to obtain a controlled electromagnetic stirring of the liquid metal, both during the melting stage and the refining stage. This stirring is intended to facilitate the optimum performance of the various steps in the process, to improve the quality of the final product and to save energy.

The invention makes it possible to operate both when the electric arc is switched on, during the melting process, and also when the electric arc is switched off, at the end of the melting process, in order to maintain the liquid metal at temperature during the refining step.

The invention is also used, as a complementary function to the electromagnetic stirring, to generate a controlled rotation of the electric arc in order to distribute and regulate its action in a uniform manner over all the periphery of the furnace, thus preventing, in particular, the formation of hot points which cause a deterioration and premature wear of the refractory material inside the furnace.

The state of the art covers the need to supply devices to mix and stir the liquid metal in electric arc furnaces in order to render the bath homogenous and to accelerate the chemical reactions of the melting process so as to obtain high quality steels with reduced working cycles.

Direct current electric furnaces include a central cathode which cooperates with a plurality of anodes suitably distributed on the floor and causes the generation of the electric arc which melts the raw material loaded into the furnace.

The electric current which is fed to generate this electric arc induces a magnetic field in the molten metal; the magnetic field interacts with the current itself and generates electromagnetic body forces which tend to partially stir the molten metal in a direction of preferential rotation.

Although in direct current electric arc furnaces the entity of the electric current and of the magnetic field induced are high, the electromagnetic forces produced are only able to achieve a modest mixing of the molten metal, which is not sufficient to satisfy the operational needs of the bath, in terms of homogeneity and uniformity, such as are required to optimise the melting process.

There are pneumatic stirring devices known to the state of the art which, although they provide an energetic stirring of the liquid metal, only do so locally; this stirring action is not therefore sufficient to homogenise the physical and chemical conditions of the bath in relatively short times.

Moreover, because of the type of gas used, these devices are either too expensive, (for example, when the gas argon is used), or else they risk compromising the final quality in certain types of product (for example when azote is used).

On the other hand however, there are no efficient mechanical means available to stir the liquid metal, both because of the high temperatures in the furnace and also because of the heterogeneous raw materials—which would compromise the functioning of the mechanical means and cause them to frequently break or malfunction.

GB-A-1.067.386 describes a magnetic stirring system achieved by means of a magnet or solenoids fed with direct current and placed below or inside the furnace.

This system is based on the generation of electromagnetic forces acting on the bath of molten metal inside the furnace by means of the interaction between a radial magnetic field and a current with a substantially vertical direction.

The system proposed by GB'386 has the advantage that it obtains a more efficient stirring of the bath without having to use magnets or high powered devices.

However, the system is only able to provide a limited stirring capacity of the liquid metal and, to be more precise, it is not possible to control the speed of the liquid metal, and vary it according to the specific step of the melting cycle and/or according to its position with respect to the surrounding refractory walls, in order to prevent progressive and premature wear and erosion.

Moreover, the system proposed by GB'386 necessarily includes the electric arc and therefore it has no function whatsoever during those steps, for example, during refining, when the furnace is working with the arc switched off.

U.S. Pat. No. 4,149,024 describes a system to control the deviation and rotation of the arc which uses a rotating magnetic field generated by electromagnets fed with three-phase currents and arranged outside the furnace.

The electromagnets produce a migrating magnetic field which interacts with the current of the arc and generates such a force that it causes the deviation and rotation of the arc itself.

The system proposed by US'024 is not able to obtain the stirring of the bath of molten metal and therefore it does not achieve the main function sought by this invention.

DE-A-3.232.551 describes a particular furnace-ladle with three upper electrodes which can act both as cathodes and as anodes; the circuit is closed by means of the slag deposited above the bath.

DE'551 includes elements identified as coils located outside the refractory material and indicated simply as electromagnetic stirrers, but the document describes neither their structure nor their functioning.

The principal purpose of the patent is to improve the treatment and refining of metallic alloys by means of heating generated by the electric arc and using the electrolytic slag as a bottom electrode.

The document therefore has no pertinence whatsoever to the purposes of this invention as regards an improvement in controlling the electromagnetic stirring of molten metal and the position of the electric arc in the melting and refining steps of the furnace.

FR-A-2.331.233 describes a direct current furnace equipped with ferromagnetic cores fed with direct current so as to obtain a controlled rotation of the electric arc.

This document also includes sensors to monitor the wear on the refractory material and the temperature, which condition the controlled rotation of the electric arc with respect to the electrode.

The arc is made to rotate by regulating the frequency and the type of connection (single-phase, two-phase, three-phase) of the ferromagnetic cores in such a way as to generate a magnetic field which, by interacting with the current of the arc, generates a force which is able to make it rotate.

When there is an asymmetric charge, the device described in FR'233 allows the speed of the arc to be varied so that it is higher in the more exposed areas and lower in the other areas.

No mention is made of any possibility of an electromagnetic stirring of the molten metal.

The article "Neue Entwicklungen für . . . " taken from Stahl und Eisen vol. 114, n°. 8, Aug. 15, 1994, pages 75–77, describes a system which controls the process of an alternating current furnace.

The article describes a control system for the arc which controls and limits the deviation thereof; this is achieved by means of an optimum arrangement of the current-bearing cables around the furnace.

In order to obtain the desired electromagnetic stirring, an element referred to simply as a coil is used, placed below the hearth of the furnace, but it is not specified if this coil is AC or DC; the coil produces a magnetic field which, by interacting with the current of the arc, generates an electromagnetic force which is able to make the liquid metal rotate.

This system does not provide to obtain the rotation of the arc, and, in order to control the deviation of the arc, it does not provide for the use of controlled and interacting electromagnetic forces.

The system used for stirring substantially has the same disadvantages already mentioned with regards to GB-A-1.067.386.

SUMMARY OF THE INVENTION

The present applicants have designed, tested and embodied this invention to overcome the shortcomings of the state of the art and to provide further advantages.

The purpose of the invention is to provide a controlled electromagnetic stirring device for the liquid metal, and the relative method, in direct current electric arc furnaces, the device being suitable to make the bath homogenous and uniform so as to accelerate the chemical reactions and make the temperatures in every part of the bath uniform.

The invention, with its continuous control and intensification of the stirring, makes it possible to improve the quality of the steel produced and at the same time accelerate the melting times of the raw material introduced.

A further purpose of the invention is to regulate the intensity of the stirring action in the liquid metal, both according to the step of the current melting cycle and also according to the position of the metal with respect to the refractory walls of the furnace.

In particular, one purpose of the invention is to regulate the speed of rotation of the liquid metal so that it is not too high near the refractory walls so as not to cause premature wear on the walls.

Another purpose is to provide a device able to continue its mixing, stirring and heating of the molten metal even after the electric arc has been switched off at the end of the melting cycle.

A further purpose is to obtain a system suitable to control the rotation of the electric arc during the melting process.

A further purpose is to allow a possible direct use of the mains power supply without the need for costly, complex and bulky rectifiers.

According to the invention, the furnace cooperates with at least a first electromagnetic system suitable to generate inside the molten metal the relative magnetic field.

The first electromagnetic system consists of at least a first winding through which current flows and which is located inside the refractory of the hearth at least in cooperation with the floor.

According to a variant, the first winding extends also for a segment of the height determined around the side walls.

In one embodiment of the invention, this segment around the side walls extends above the maximum level of the liquid metal in the hearth, in such a way that a portion of the spirals of the winding are always above the meniscus of the molten metal.

In one embodiment of the invention, this first winding consists of an electric conductor which is hollow inside.

According to a variant, the hollow electric conductor is cooled with air, water, resins, or organic solutions, liquid metal or other substances circulating inside.

According to a variant, the first electromagnetic system also comprises a second winding defined by concentric spirals positioned below and outside the floor of the hearth, in such a way as to compose a plurality of rings on a vertical axis, placed one above the other to circumscribe the ideal extension downwards of the portion of the floor occupied by the anodes.

According to one embodiment of the invention, the first and second windings are independent.

According to a variant, there is a single winding which comprises the first and second windings.

In another embodiment, each of these two windings consists of individual independent spirals.

According to the invention, the vertical and radial components of the overall magnetic field generated inside the molten metal by the two windings interact respectively with the radial and vertical components of the operating current of the furnace produced through the electric arc, or those of the overall current circulating inside the liquid metal, generating electromagnetic forces with a helical development which stir the mass of molten metal.

According to a first variant, in cooperation with, or as an alternative to, the first electromagnetic system, there is a second electromagnetic system associated with the furnace consisting of the anodes of the furnace themselves, through which a supplementary electric current is fed which flows from one anode to the adjacent one, flowing through the liquid metal with a substantially horizontal development.

According to one embodiment of the invention, this supplementary electric current, as it circulates through the molten metal in pre-established ways and directions, is induced by coils associated with the anodes and rectified by means of the appropriate straightening systems.

The rectified current generates a relative magnetic field which interacts with the main current which generates the electric arc, causing the formation of electromagnetic body forces, helical in development, which cause the stirring of the liquid metal.

The rectified current may also interact with the magnetic field produced by the first electromagnetic system, when it is activated, in order to increase the radial content of the current, increasing the intensity of the helical body forces which stir the liquid metal. The rectified current can also act when the arc is switched off, during the refining step which follows melting, in order to maintain the liquid metal at temperature even when there is no arc.

Furthermore, the rectified current between the anodes can be used to melt the portion of metal above the floor, at the beginning of the melting process, by exploiting the Joule effect produced by the passage of the current.

The currents which feed the first and second electromagnetic system, which may or may not be the same main operational current of the furnace by means of a serial connection, are continuously controlled so as to regulate the parameters of correlation which affect the electromagnetic forces induced on the molten metal.

This makes it possible to vary the intensity of the stirring of the bath according to the requirements of the process as they occur during the cycle.

According to the invention, by varying the value of the electric current circulating in the first and second electromagnetic systems, it is possible to vary the electromagnetic forces which create the vortex around the vertical axis of the furnace, both in terms of direction and of value, by increasing or reducing the stirring effect at the centre or at the periphery, or by varying locally the distribution of the intensity of the stirring action.

Moreover, by varying the direction of flow of the currents in the two units, first and second, it is possible to change the sense of rotation in which the liquid metal is mixed.

In one embodiment of the invention, in order to increase the radial component of the main working current of the furnace, and therefore to increase the entity of the helical forces stirring the liquid metal, the anodes are arranged on the floor of the hearth as far as possible from the longitudinal axis of the cathode, compatible with the size of the furnace and the efficiency required of the electric arc.

According to a variant, the anodes are arranged in the floor of the furnace at the apexes of an equilateral triangle, with a fourth anode positioned at the centre of the triangle.

The anodes can be connected to each other in the desired manner so as to create the desired circulation of current.

With the configuration described above, it is possible to considerably increase the radial component of the current so as to generate stirring forces of high intensity so that, when there is an inter-anode current of 25 kA, it is possible to generate average speeds of the liquid metal at the bottom of the bath of up to 0.5 meters per second when the arc is switched off.

When the arc is switched on, the stirring effect is added to that which is caused intrinsically by the arc, and thus allows extremely high stirring speeds to be reached.

According to a further variant, which has a number of anodes to a multiple of three, each anode is equipped with inductors connected to the three-phase electricity supply by a star or triangle connection.

The alternating currents circulating through these anodes generate in turn a rotating magnetic field which induces a stirring motion in the bath of liquid metal in an azimuth direction.

By using this system, the bath is stirred in two directions; the first is an azimuth direction due to the rotating magnetic field and the second is a helical direction due to the bending of the currents leaving the anodes.

This embodiment makes it possible to work on the industrial mains frequency and, in particular cases, it may be used independently of any other magnetic field sources.

According to a variant, in cooperation with the star or triangle arrangement of the anodes, a coil is used which is arranged around the furnace in such a way as to generate a rotating magnetic field.

This configuration thus provides a magnetic field generated by the rotating currents which interacts with the rotating magnetic field generated by the coil.

The reciprocal arrangement of the coil and the anodes must be such as to provide the maximum interaction between the rotating magnetic field produced by the coil and the rotating current circulating between the anodes.

To be more precise, the reciprocal arrangement must be such that the vector of overall current between the anodes forms, with the rotating field produced by the coil, an angle of nil around the point where the field is at its greatest.

This embodiment has the advantage that it uses current taken directly from the power supply, without needing to use costly and bulky rectifiers.

According to another feature of the invention, the interaction between the axial component of the main working current which generates the voltaic arc and the radial component resulting from the magnetic fields generated by the electromagnetic systems mentioned above, makes it possible to obtain a magneto-gasdynamic rotation of the voltaic arc.

This rotation of the arc is also encouraged by the fact that the spirals of the first winding are located above the maximum level reached by the meniscus of the liquid metal, thus making it possible to have the greatest concentration of magnetic flow within the field of action of the voltaic arc and increasing the radius of rotation thereof.

The presence of a shell made of ferromagnetic material, at least around the hearth and the second winding located around the anodes, further increases the field throughout the furnace, and also increases the rotary effect of the arc.

According to another variant, the first winding is located outside the refractory layer which defines the walls and the floor of the furnace.

In this case, between the refractory material and the first winding there is a protective layer made of non-ferromagnetic material while the ferromagnetic shell is placed further out from the first winding.

BRIEF DESCRIPTION OF THE DRAWINGS

The attached figures are given as a non-restrictive example and show some preferred embodiments of the invention as follows.

DETAILED DESCRIPTION OF THE PREFERRED EMBODIMENTS

The electric arc furnace 10 using the system according to the invention is the direct current type and has a cathode 11 placed at the centre, cooperating with a plurality of anodes 12 located on the floor 13 of the hearth 35.

In the case of FIGS. 1–4, there are four anodes 12 arranged symmetrically to the longitudinal axis of the cathode 11 in a position as far as possible from the longitudinal axis compatible with the inner size of the floor of the furnace.

Figure 1:
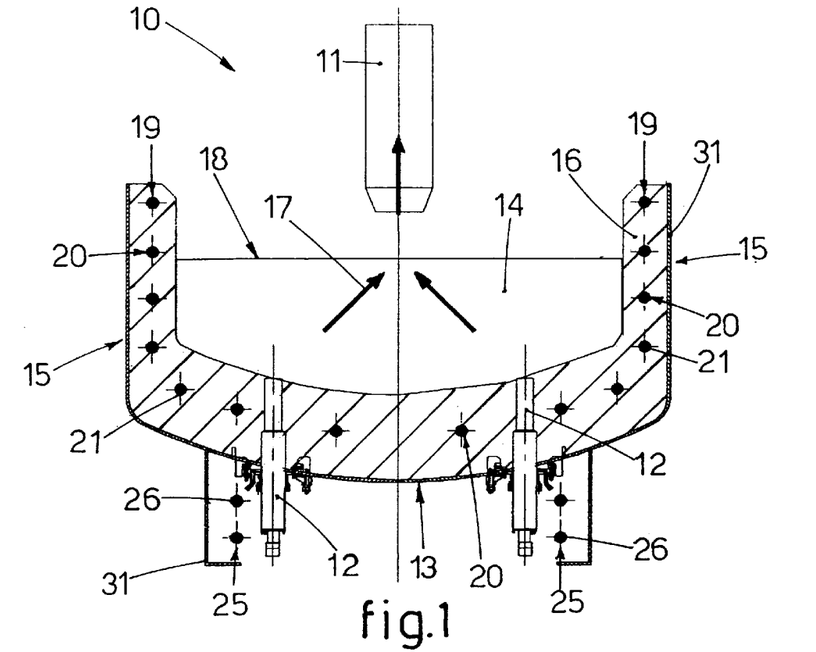
FIG. 1 is a part view in longitudinal section of an electric arc furnace employing the system according to the invention.
Figure 2:
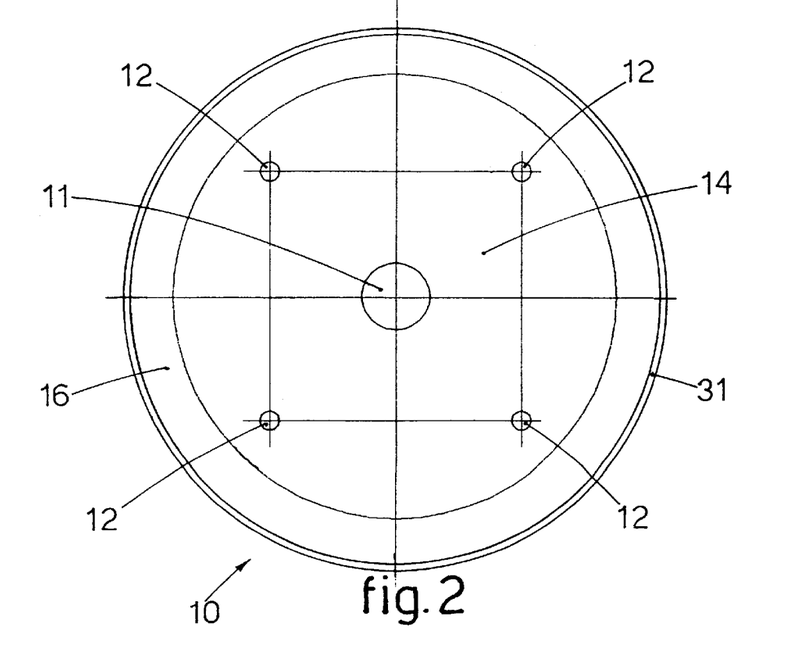
FIG. 2 shows a plane view of the furnace in FIG. 1.

Both the floor 13 and the side walls 15 of the hearth 35 of the furnace 10 are made of refractory material 16 so as to contain the liquid metal 14.

By passing a main electric current $I_0$ between the anodes 12 and the cathode 11 through the liquid metal 14, an electric arc 17 is formed which melts the scrap, until a liquid bath is obtained which reaches a determined maximum level 18.

Inside the refractory material 16, both of the floor 13 and of the side walls 15, there is a first electromagnetic system consisting, in this case, of a first winding 19 through which an electric current $I_1$ flows.

This first winding 19 is defined, in this case, by a plurality of spirals 20 made of a tubular electric conductor 21, cooled by air, water, resin or organic substances, liquid metal or other substances.

Figure 5:
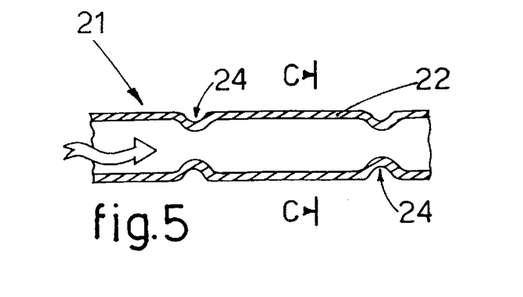
FIG. 5 shows the detail B of FIG. 3 in large scale.

In the embodiment shown in FIG. 5, this electric conductor 21 is made of copper, is air-cooled and consists of a metallic pipe 22 inside which the cool air of the heat exchange flows.

According to a variant, the metallic pipe 22 is made of aluminium, aluminium and copper or of other metallic alloys.

In order to maximise the removal of heat by the fluid circulating inside the pipe 22, the inner surface has fins or ridges 23 (FIG. 6) so as to increase the surface available for heat exchange.

Figure 6:
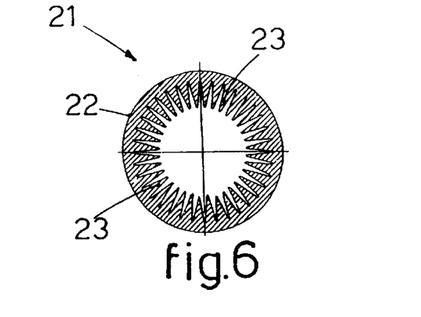
FIG. 6 shows the section from C to C of FIG. 5.

Moreover, again to improve the efficiency of the cooling system, the metallic pipe 22 has, in this case at regular intervals, a series of parts 24 which are narrower in section, of such a shape as to increase the turbulence and therefore the heat exchange between the cooling fluid and the walls.

Figure 9:
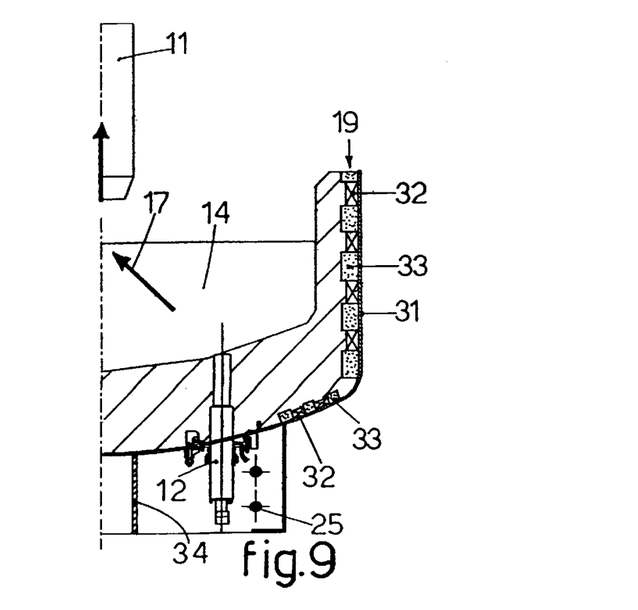
FIG. 9 shows a diagram of another embodiment of the invention.

According to the variant shown in FIG. 9, the first winding 19 consists of solid, copper conductors 32, rectangular in shape, positioned near the ferromagnetic outer shell 31.

This embodiment makes it unnecessary to cool the conductors since the distance with respect to the liquid metal bath makes the quantity of heat exchanged through the shell 31 sufficient.

In the solution shown in FIG. 9, in order to increase the level of the magnetic field while still using the same current, from the outer shell 31 there are pole pieces 33 arranged at an intermediate position between the rectangular conductors 32.

A further solution includes a concentrator pole 34, arranged near the vertical axis of the furnace 10; its function is to concentrate the lines of the field in the central area of the liquid metal bath 14.

In this case, the first winding 19 extends on the side walls 15 until it reaches a height greater than the maximum level 18 of the liquid metal 14. In one embodiment of the invention, the portion of the winding 19 placed above this maximum level is at least 20% of the whole winding.

Underneath the floor 13 of the furnace 10 the first electromagnetic system also comprises a second winding 25 defined by a plurality of spirals 26 which circumscribe the four anodes 12. This second winding 25, whose vertical axis coincides advantageously with the vertical axis of the furnace 10, is fed by an electrical current $I_2$.

According to one formulation of the invention, the current $I_2$ is the same current $I_0$ which generates the electric arc 17 and is fed by means of a serial connection to the main power circuit of the furnace.

According to a variant, the current $I_2$ is supplied autonomously and its value can be controlled.

In this case, there is a second electromagnetic system consisting of the anodes 12 themselves.

Figure 4:
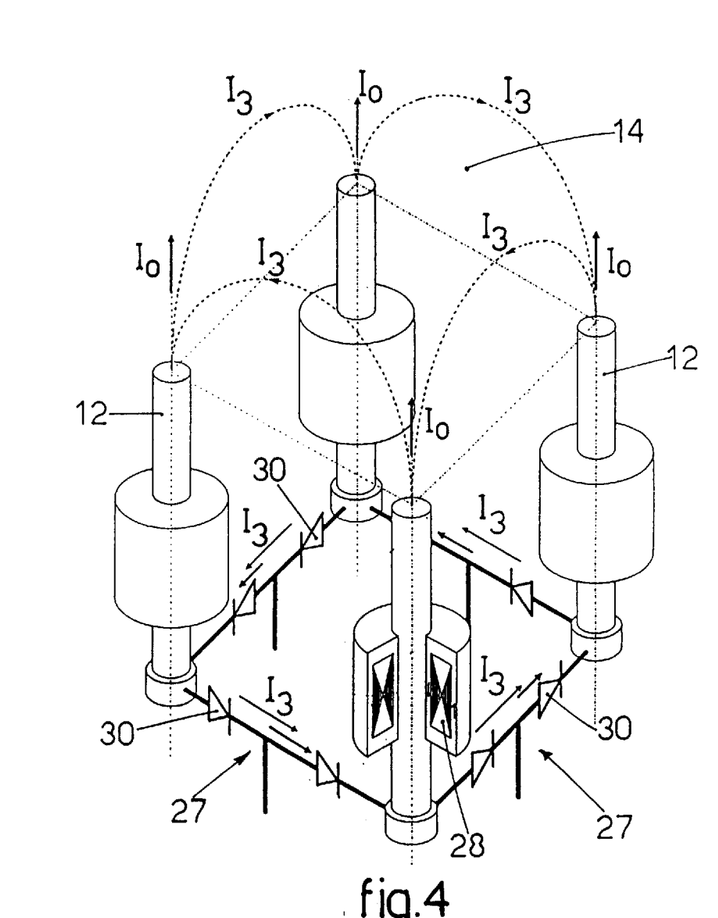
FIG. 4 shows the detail A of FIG. 3 in large scale.

With reference to FIG. 4, pairs of adjacent anodes 12 are fed by means of an inductor system defined by a relative circuit of primary current and a relative circuit of secondary induced current.

Each anode 12 is associated with a relative coil 28 able to induce on the anode 12 a secondary induced current $I_3$ which is closed along line 27, in a single and determined direction established by the diodes 30, on the adjacent anode 12 through the liquid metal 14.

The Joule effect produced by this secondary current $I_3$ on the liquid metal 14 may have two functions: to maintain the metal liquid and at temperature even when the voltaic arc 17 is switched off after the material is totally melted, for example in the refining step, and also to melt the solid hearth of the furnace at the beginning of the melting process.

The effect of this secondary current $I_3$, moreover, is to create strong gradients of magnetic field inside the liquid metal 14 which interacts with the working current of the furnace and generates body forces of a helical development which stir the bath.

This effect may be added to that generated by the first electromagnetic system, and thus increase the forces stirring the liquid metal.

Figures 10, 11, 12, 13:
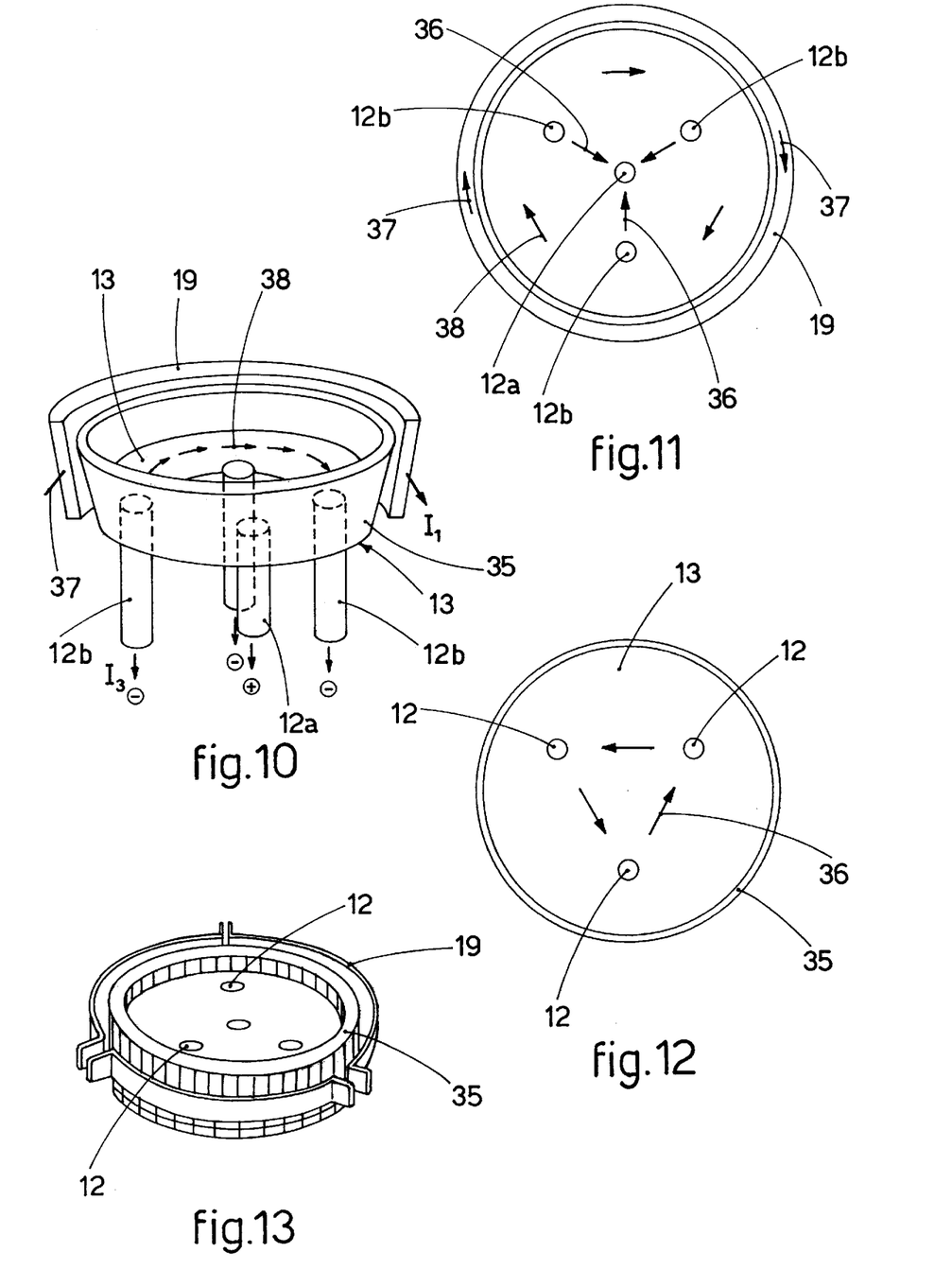
FIGS. 10 and 11 show, from the side and from above, a first configuration of the anodes of the furnace.
FIGS. 12 and 13 show, from above and the side, a second configuration of the anodes of the furnace.

In the variant shown in FIGS. 10 and 11, there are four anodes 12, of which three 12b are arranged on the apexes of an equilateral triangle and the fourth anode 12a is arranged at the centre of the triangle.

The anodes 12 are electrically connected to each other in the desired way; in this case they are fed by a rectified single-phase alternating current in such a way that the circuit closes on the central anode 12a.

This configuration of the anodes 12 generates a strong radial component to the current which can be used alone to induce azimuth forces which cause the stirring of the molten metal bath; or it can interact with the magnetic field generated by the first winding 19 and/or the second winding 25 in such a way as to intensify the stirring.

The type and intensity of the stirring in this case depends to a large extent on the quantity and arrangement of the scrap inside the hearth 35.

The direction of the current between the anodes 12 may also be different from the one shown here.

This solution makes the device according to the invention extremely flexible because it is possible to obtain satisfactory results both when the arc is switched on and when it is switched off, and also when other electromagnetic systems are associated with the device, and when they are not.

In FIGS. 11 and 12, the reference number 36 denotes the currents circulating between the anodes 12, in this case from the outer anodes 12b to the central anode 12a; the reference number 37 denotes the currents circulating in the first winding 19, while the reference number 38 denotes the direction of rotation of the liquid metal 14 inside the hearth 35.

In the further embodiment shown in FIGS. 12 and 13, the anodes 12 are three in number (but there may be six or a multiple of three) and are fed by means of inductors connected to the three-phase electrical supply by a star or triangle connection.

This direction of circulation of the currents 36 between the anodes 12 generates a rotating magnetic field which induces an azimuth movement of the liquid metal 14.

The azimuth movement which derives from the rotating magnetic field is added to the helical movement of the liquid metal 14 generated by the bending of the currents leaving the anodes 12.

This configuration makes it possible to use the inter-anode currents 36 as a single means to generate an efficient electromagnetic stirring using the current taken directly from the mains supply.

In the variant shown in FIG. 13, the electromagnetic system with currents circulating between the anodes 12 cooperates with the first winding 19 and/or the second winding 25 so as to intensify the resulting stirring forces.

In this way, the magnetic field produced by the rotating currents 36 circulating between the anodes 12 is increased by the presence of the rotating magnetic field produced by the first winding 19 and/or the second winding 25.

By configuring in the appropriate manner the reciprocal arrangement of the windings 19, 25 and the anodes 12, it is possible to obtain a maximum interaction of the rotating magnetic field and the rotating currents 36 circulating between the anodes 12, in such a way as to maximise the resulting stirring effect.

In order to increase the density of the magnetic flows generated inside the furnace by the aforesaid electromagnetic systems, the furnace 10 is lined by a shell 31 made of ferromagnetic material.

In this case, the shell is made of carbon steel and is at least 30 mm thick.

Figure 3:
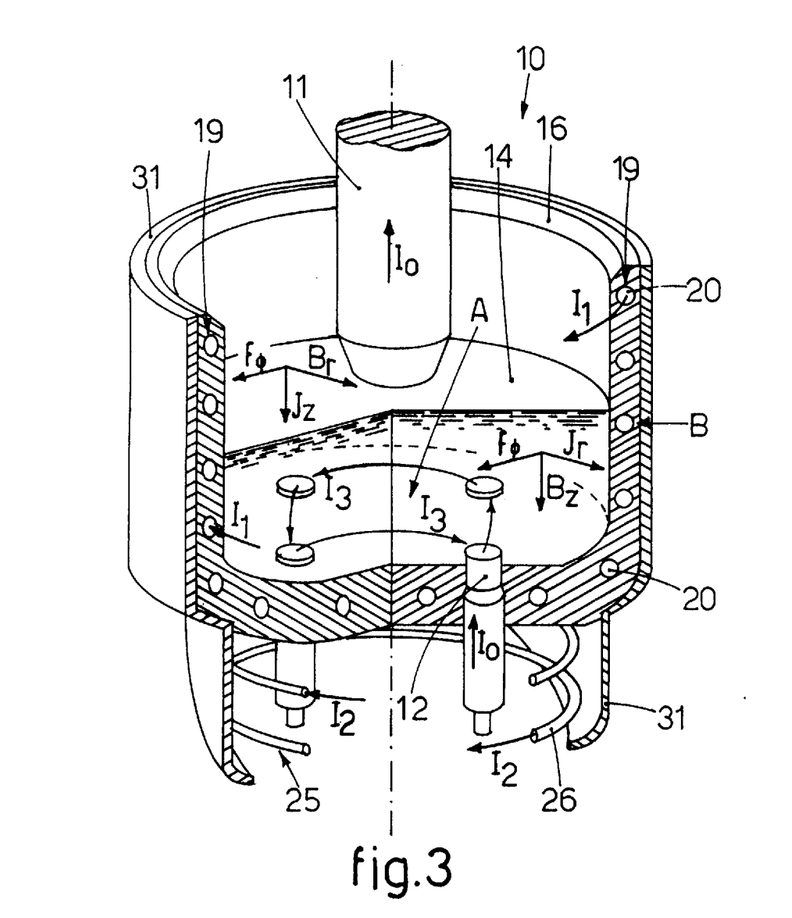
FIG. 3 shows, in a partial cutaway view, a three dimensional diagram of the furnace in FIG. 1.

The working of the invention is shown diagrammatically in FIG. 3.

The first winding 19 and the second winding 25 are fed respectively by a current $I_1$ and a current $I_2$; the anodes 12, adjacent and in twos, are affected by the circulation of secondary currents $I_3$.

Each of these currents $I_1$, $I_2$ generates in the liquid metal 14 its own magnetic field which has a vertical component $B_z$ and a radial component $B_r$.

The current $I_3$ contributes to the total current inside the liquid bath 14.

The interaction between the radial component $B_r$ and the vertical component $B_z$ of the magnetic field induced with the vertical $J_z$ component of density and the radial component $J_r$, of the overall current in the liquid metal bath 14 generates helical electromagnetic forces $f_\phi$ defined by the following vectorial relationship:

$$f_\phi = J_r B_z + J_z \cdot B_r$$

The main effect of these forces is to generate on the liquid metal 14 a rotation torque around the vertical axis of the furnace 10.

Further helical forces to stir the liquid metal 14 are obtained from the interaction between the secondary current $I_3$, induced by the coils 28 and rectified by the diodes 30, and the magnetic field components produced by the first 19 and second 25 electromagnetic units.

Due to the presence in the liquid metal bath 14 of the inductive windings 19 and 25 and the currents $I_3$, in the area of the arc 17 there is moreover a radial component $B_r$ of the magnetic field which, interacting with the strong vertical component of the density $J_z$ of the current of the arc 17, generates on the arc itself a body force $f_\phi$ which makes it rotate; this force $f_\phi$ is given by the vectorial product of $J_z$ and $B_r$.

The radius of rotation of the arc 17 is a function of various factors of which the most important are the density of the main current $I_0$, the density of the magnetic flow of the field, the length of the arc, the composition of the gas present and the temperature of the plasma.

The rotary movement of the arc is particularly efficacious as it encourages an efficient and uniform melting of the material and prevents the formation of hot points in the furnace which encourage the non-uniform wear of the refractory material.

By varying the value of the currents circulating in the aforesaid electromagnetic systems, 19, 25, 27–28, it is possible to vary the entity of the electromagnetic field both in terms of intensity and in terms of the distribution of the lines of magnetic flow.

Since it is possible to make the electromagnetic systems act independently of each other, excluding one or the other if necessary, it is also possible to obtain different characteristics of the mixing and stirring of the liquid metal 14, both in terms of intensity and of location, in such a way that they can be adapted to the various steps of the production cycle.

Figure 7A:
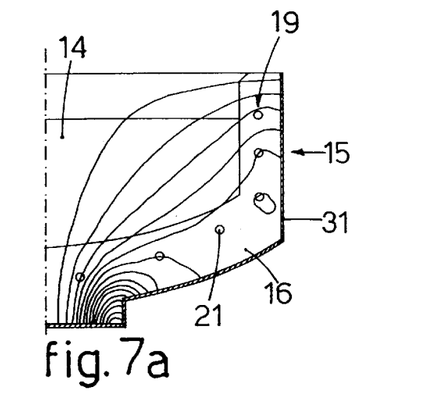
FIGS. 7a and 7b show a part view of a diagram of the furnace of FIG. 1 in two possible operating conditions.
Figure 7B:
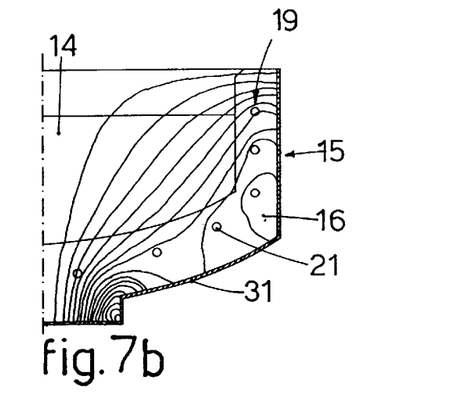

In the example shown in FIG. 7a, the first winding 19 is fed by a current $I_1$ which is very low, while in the example shown in FIG. 7b the current $I_1$ is of a greater intensity.

In the example shown in FIG. 7b, the lines of magnetic flow are denser than those in FIG. 7a, and the centre of the helical electromagnetic force $f_\phi$ is displaced towards the side wall 15 and therefore the stirring of the liquid metal 14 will consequently be intense.

In FIGS. 7a and 7b it can also be seen that the shell 31 made of ferromagnetic material absorbs the magnetic flow and therefore the magnetic field component $B_z$ keeps the same sign continuously; the direction of the torque imparted to the liquid metal 14 by the helical electromagnetic force $f_\phi$ is thus maintained continuously.

In this case, even when the electric arc 17 is switched off, the liquid metal 14 can continue to be stirred by means of the interaction of the currents $I_3$ between adjacent anodes 12 and the magnetic fields generated by the first 19 and the second 25 windings.

The intensity of the stirring action is a function of the intensity of the currents circulating in the individual electromagnetic units.

Figure 8:
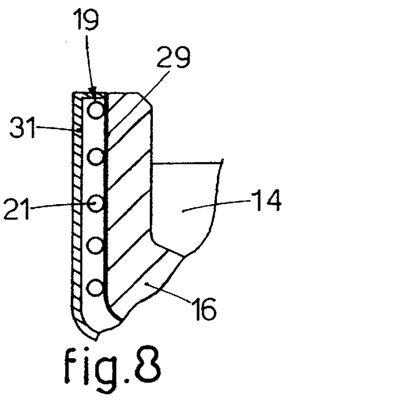
FIG. 8 shows in part view a variant of FIG. 1.

In the variant shown partially in FIG. 8, in order to facilitate any necessary operations of maintenance, or also in the event that the system is installed on pre-existing furnaces, the first winding 19 is located outside the refractory material 16.

In this case, between the first winding 19 and the refractory material 16 there is a further protective layer 29 made of non-ferromagnetic material while the shell 31 made of ferromagnetic material is located in a position farther from the centre than the first winding 19.

Where there is a cooling system for the anodes 12 using liquid metal, when the arc 17 is switched off at the end of the melting process during refining and decarbonisation, the second electromagnetic system can be used to supply induced current $I_3$ through the anodes 12 in order to keep the metallic cooling fluid moving.

The secondary current $I_3$, induced by the coils 28, supplies heat by means of the Joule effect both to prevent the solidification of the metallic cooling fluid in the anodes 12, thus maintaining an efficient cooling, and also to keep the liquid metal bath 14 hot, possibly even when the arc 17 is switched off.

We claim:

1. Method for the electromagnetic stirring of liquid metal in direct current electric arc furnaces comprising a hearth containing the liquid metal bath defined by a floor and by side walls made of refractory material, the electric arc furnaces including a central cathode cooperating with a plurality of anodes distributed on the floor, comprising the steps of feeding the anodes by a main current ($I_0$) which flows through the liquid metal towards the central cathode generating the electric arc, and generating a magnetic field inside the liquid metal whose vertical component ($B_z$) and radial component ($B_r$) interact respectively with a radial component ($J_r$) and a vertical component ($J_z$) of an overall current present in the liquid metal in order to generate electromagnetic forces ($f_\phi$) to agitate the liquid metal, wherein the magnetic field is generated by at least a first electromagnetic system comprising at least a first winding through which a current ($I_1$) flows, wherein the first winding comprises a plurality of spirals, at least some of the spirals being arranged inside the refractory of the hearth in cooperation with the floor and with at least a vertical segment of the sidewalls, and wherein the overall current comprises at least the main current ($I_0$).

2. Method as in claim 1, wherein the magnetic field is generating by the first electromagnetic system and a second electromagnetic system generating a secondary induced current ($I_3$), between the adjacent anodes which circulates through the liquid metal, and wherein the overall current comprises the main current and the secondary induced current ($I_3$).

3. Method as in claim 1, in which the first electromagnetic system is provided to make a current ($I_2$) circulate through a second winding with spirals arranged outside the floor and limited to the downwards extension of the portion of the floor occupied by the anodes. forces to stir the liquid metal (14).

4. Method as in claim 2, in which, when the electric arc is switched on, the magnetic field generated by at least one of the first and second electromagnetic systems interacts with the main current generating the electric arc to produce helical forces to stir the liquid metal.

5. Method as in claim 2, in which, when the electric arc is switched off and at the end of a melting cycle, the induced current ($I_3$) circulating between the anodes and flowing through the liquid metal maintains the liquid metal at temperature during a refining step.

6. Method as in claim 2, in which, when the electric arc is switched off and at the beginning of a melting cycle, the induced electric current melts the layer of metal present above the floor of the hearth.

7. Method as in claim 2, in which the anodes are arranged in a configuration wherein three outer anodes are arranged at apexes of an equilateral triangle and a fourth anode is arranged at a center of the equilateral triangle.

8. Method as in claim 7, in which the induced current ($I_3$) is made to circulate from the outer anodes to the central anode.

9. Method as in claim 7, in which the induced current ($I_3$) is made to circulate from the central anode to the outer anodes.

10. Method as in claim 2, in which the induced current ($I_3$) is taken directly from a mains supply and is made to circulate between three anodes or a number of anodes which is a multiple of three, arranged in a star or triangle configuration.

11. Method as in claim 2, in which at least one of the intensity and the direction of the current circulating in at least one of the first and the second electromagnetic system are regulated according to a step of a melting cycle, according to the direction of rotation to be induced on the electric arc and according to a position with respect to the refractory walls and floor of the furnace.

12. A direct current electric arc furnace including a device for the electromagnetic stirring of liquid metal, comprising a hearth containing the liquid metal bath defined by a floor and by side walls made of refractory material, a central cathode cooperating with a plurality of anodes distributed on the floor, the anodes being fed by a main current ($I_0$) which flows towards the central cathode generating the electric arc, the device for the electromagnetic stirring comprising an electromagnetic system generating a magnetic field inside the liquid metal including a first electromagnetic system comprising at least a first winding through which a current ($I_1$) flows, said first winding comprising a plurality of spirals, at least some of the spirals being arranged inside the refractory of the hearth in cooperation with the floor and with at least a vertical segment of the side walls.

13. Device as in claim 12 in which the first electromagnetic system comprises a second winding through which a current ($I_2$) flows and which comprises concentric spirals arranged outside the floor and circumscribing a downwards extension of the portion of the floor occupied by the anodes.

14. Device as in claim from 13, in which the secondary induced current ($I_3$) circulating between the anodes interacts with the components of the magnetic field of the first and the second winding so as to produce electromagnetic forces ($f_\phi$) with a helical trend to stir the liquid metal.

15. Device as in claim 13, in which at least one of the first and the second windings are fed by the main current ($I_0$).

16. Device as in claim 13, in which the first and/or the second windings consist of a single winding.

17. Device as in claim 13, in which a radial component ($B_r$) of the overall magnetic field generated by the two windings and by the second electromagnetic system interacts with a vertical component ($J_z$) of the main current ($I_0$) of the furnace so as to generate a force to rotate the electric arc around a vertical axis of the furnace.

18. Device as in claim 12, which comprises a second electromagnetic system comprising of means to generate a secondary induced current ($I_3$) between adjacent anodes, the current ($I_3$) circulating through the liquid metal.

19. Device as in claim 18, in which the means to generate the secondary induced current ($I_3$) comprise feeding means consisting of coils associated with the relative anodes (12), a secondary circuit associated with the coils comprising the anodes themselves, the liquid metal and lines to close the secondary circuit comprising diodes to rectify the current, the secondary induced current ($I_3$) circulating through the liquid metal even when the electric arc is switched off.

20. Device as in claim 19, in which, when the electric arc is switched on, the secondary induced current ($I_3$) produces a magnetic field in the liquid metal interacting with the main current ($I_0$) which generates the electric arc so as to produce electromagnetic forces ($f_\phi$) with a helical trend to stir the liquid metal (14).

21. Device as in claim 12, in which there are four anodes through which an induced current ($I_3$) flows and which are arranged in a configuration wherein three outer anodes occupy apexes of an equilateral triangle and an inner anode occupies a center of the triangle.

22. Device as in claim 12, in which there are three anodes, or a multiple of three anodes, arranged in a star or triangle configuration, through which an induced current flows which is taken directly from a supply network.

23. Device as in claim 12, in which at least some of the spirals of the first winding are located outside the refractory material there being included a non-ferromagnetic protective layer between the conductors and the refractory material.

24. Device as in claim 12, in which the vertical segment of the side walls of the hearth occupied by the spirals of the first winding extends to a level at least equal to a maximum level of the liquid metal.

25. Device as in claim 24, in which the spirals present above the maximum level are at least 20% of the total number of spirals defining the first winding.

26. Device as in claim from 12, in which at least some of the spirals of the first winding are located inside the refractory adjacent to a ferromagnetic shell which surrounds at least the hearth of the furnace, there being included pole pieces between adjacent spirals.

27. Device as in claim 12, in which the spirals of the first winding are made with a tubular conductor cooled on the inside.

28. Device as in claim 27, in which the cooling is achieved by means of air, water, liquid metal or resin.

29. Device as in claim 27, in which the tubular conductor includes inside a plurality of longitudinal cooling fins.

30. Device as in claim 27, in which the tubular conductor includes, at defined intervals, areas narrower in cross section.

* * * * *